United States Patent
Branover et al.

(10) Patent No.: US 9,785,218 B2
(45) Date of Patent: Oct. 10, 2017

(54) PERFORMANCE STATE SELECTION FOR LOW ACTIVITY SCENARIOS

(71) Applicants: Advanced Micro Devices, Inc., Sunnyvale, CA (US); ATI Technologies ULC, Markham (CA)

(72) Inventors: Alexander J. Branover, Boxborogh, MA (US); Adam N. C. Clark, Markham (CA); Ashish Jain, Austin, TX (US); Sridhar V. Gada, Bangalore (IN)

(73) Assignees: Advanced Micro Devices, Inc., Sunnyvale, CA (US); ATI Technologies ULC, Markham Ontario (CA)

( * ) Notice: Subject to any disclaimer, the term of this patent is extended or adjusted under 35 U.S.C. 154(b) by 0 days.

(21) Appl. No.: 14/846,058

(22) Filed: Sep. 4, 2015

(65) Prior Publication Data
US 2016/0306406 A1    Oct. 20, 2016

Related U.S. Application Data

(60) Provisional application No. 62/150,109, filed on Apr. 20, 2015.

(51) Int. Cl.
*G06F 1/32* (2006.01)
*G06F 9/50* (2006.01)

(52) U.S. Cl.
CPC ............ *G06F 1/3206* (2013.01); *G06F 1/324* (2013.01); *G06F 1/329* (2013.01); *G06F 1/3228* (2013.01); *G06F 1/3296* (2013.01); *G06F 9/5094* (2013.01)

(58) Field of Classification Search
CPC .... G06F 1/3234; G06F 1/3287; G06F 1/3203; G06F 1/3296; G06F 1/3206
USPC ................................... 713/320, 323
See application file for complete search history.

(56) References Cited

U.S. PATENT DOCUMENTS

| | | | |
|---|---|---|---|
| 6,901,524 B2* | 5/2005 | Watts, Jr. ................. | G06F 1/206 713/320 |
| 9,292,072 B2* | 3/2016 | Yang ....................... | G06F 1/3228 |
| 2012/0102344 A1* | 4/2012 | Kocev .................... | G06F 1/3237 713/322 |
| 2013/0182272 A1* | 7/2013 | Lim .................... | H04N 1/00888 358/1.13 |
| 2013/0212417 A1* | 8/2013 | Frid ....................... | G06F 1/3203 713/323 |

(Continued)

OTHER PUBLICATIONS

AMD "AMD Announces Its Most Advanced Mobile APUs for Consumer and Commercial Notebooks," downloaded from http://www.amd.com/en-us/press-releases/Pages/advanced-mobile-apus-2014jun04.aspx on Jun. 26, 2015, 2 pages.

*Primary Examiner* — Chun Cao
(74) *Attorney, Agent, or Firm* — Zagorin Cave LLP

(57) ABSTRACT

A power management controller tracks the idle state of a compute unit and compares the tracked idle state with a first threshold. If the tracked idle state is above the first threshold a power state of the compute unit is limited to a low power state so that the power state does not rise due to activity that occurs in low utilization scenarios. The tracked idle state is compared to a second threshold and if the tracked idle state is below the second threshold, indicating that the compute unit is not in a low utilization scenario, a limit on the power state is removed and the power state of the compute unit is allowed to rise.

20 Claims, 3 Drawing Sheets

(56) References Cited

U.S. PATENT DOCUMENTS

| | | |
|---|---|---|
| 2013/0328890 A1* | 12/2013 | Avkarogullari ....... G06F 1/3234 345/501 |
| 2014/0181557 A1 | 6/2014 | Branover et al. |
| 2014/0331069 A1 | 11/2014 | Branover et al. |
| 2014/0344599 A1 | 11/2014 | Branover et al. |
| 2015/0006925 A1 | 1/2015 | Branover et al. |

* cited by examiner

```
If (Cores are Idle)
        If (IdleCounter < SaturationLimit)
              idleCounter ++
        Else // no change
Else    If (IdleCounter >0)
              idleCounter --
        Else //no change
```

PERFORMANCE STATE SELECTION FOR LOW ACTIVITY SCENARIOS

CROSS-REFERENCE TO RELATED APPLICATION(S)

This application claims the benefit of U.S. provisional application No. 62/150,109, filed Apr. 20, 2015, entitled "Performance State Selection for Low Activity Scenarios," naming inventors Alexander Branover, Adam N. C. Clark, Ashish Jain, and Sridhar V. Gada, which application is incorporated by reference herein in its entirety.

BACKGROUND

Field of the Invention

Embodiments described herein relate to power management and particularly to more effective use of idle states.

Description of the Related Art

Reducing power consumption and extending battery life are ongoing goals of electronic system design. The Advanced Configuration and Power Interface (ACPI) specification is an industry standard that defines common interfaces for power management and gives the operating system (OS) control of power management. For microprocessors, ACPI-based low-power states have been employed to reduce power consumption. The ACPI standard specifies various groups of states, among them global states, device states, performance states, and processor states. The ACPI standard defines four processor power states, C0-C3. C0 is the operating state. In state C1 the processor is halted and does not execute instructions, but can instantaneously return to an executing state. In state C2 the processor stops clocks but maintains cache contents and all software-visible state data, and services cache coherency probes. Finally, in state C3 (a Sleep state), the processor maintains cache contents and software state, but lowers voltage to a level sufficient to maintain the saved state. While these power states have been useful in helping save power, additional power savings remains a focus of system goals, particularly for battery powered systems.

SUMMARY OF EMBODIMENTS OF THE INVENTION

Accordingly, in one embodiment a method includes tracking the idle state of a hardware component and comparing the tracked idle state with a first threshold. If the tracked idle state is above the first threshold, a power state of the hardware component is limited to be in a low power state. The tracked idle state is compared to a second threshold and if the tracked idle state is below the second threshold, a limit on the power state is removed.

In another embodiment a power management controller includes idle state tracker logic to track an idle state of a compute unit and generate a tracked idle state. Compare logic compares the tracked idle state with a first threshold and provides a first compare indication thereof. The power management controller is responsive to the first compare indication indicating that the tracked idle state is above the first threshold to cause a power state of the hardware component to be limited to a low power state. The compare logic is further configured to compare the tracked idle state with a second threshold and provides a second compare indication thereof. The power management controller is responsive to the second compare indication indicating that the tracked idle state is below the second threshold to remove a limit to the power state of the hardware component and allow the power state of the compute unit to increase.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Computer systems may include multiple compute units such as central processing units (CPUs), and/or graphics processing units (GPUs), which enter states of low activity or low utilization. In order to increase the performance per watt without risk of performance loss or to increase the battery life without noticeable performance loss, or with acceptable performance loss in the battery life scenarios, the power state of the compute unit, when the compute unit is sufficiently idle, is maintained at a low performance power state rather than letting short periods of high activity cause the performance state to be increased. In scenarios in which a user is primarily concerned with battery life, the limitation on power states may be enforced in an even more aggressive manner.

Figures 1, 2:
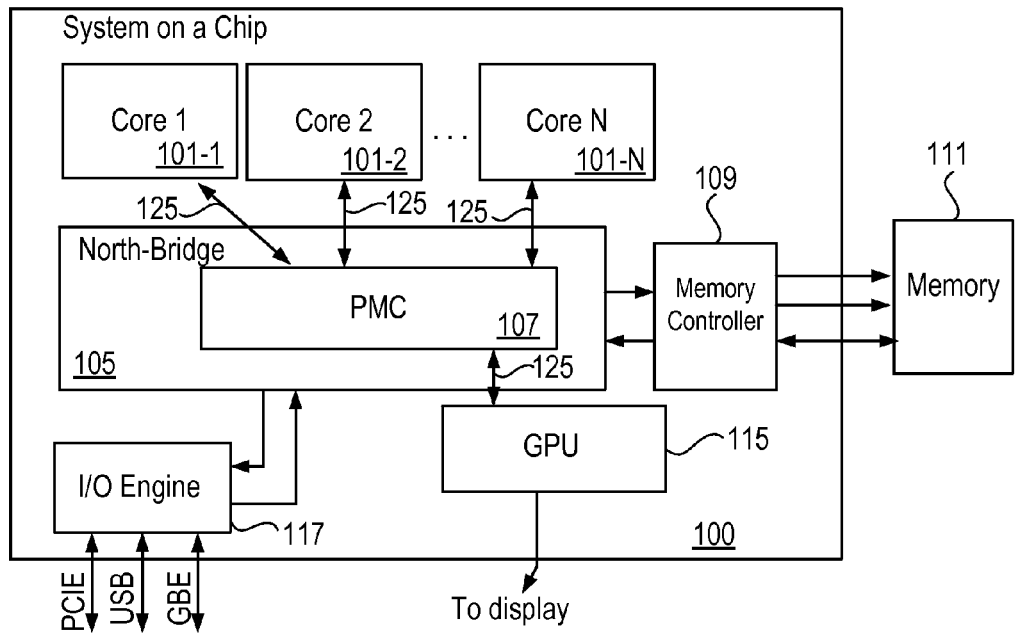
FIG. 1 is a high level block diagram of a system that may utilize one or more embodiments.
FIG. 2 illustrates pseudo code for generation of an idle counter value.

FIG. 1 illustrates a system on a chip (SoC) 100 that is suitable for incorporating one or more embodiments described herein. The SoC 100 includes one or more processing cores 101-1 through 101-N, where N is an integer. Note that one or more of the processing cores 101-1 through 101-N may be a GPU and/or a CPU. The SoC 100 also includes a North Bridge 105 including a power management controller 107, a memory controller 109, memory 111, a GPU 115 separate from cores 101, an input/output engine 117. North Bridge 105 manages communications between certain elements of SoC 100. For example, North Bridge 105 can be configured to facilitate memory requests from cores 101 to memory controller 109 and interface with input/output from I/O engine 117.

Power management controller 107 manages power states associated with various hardware blocks of SoC 100. The memory controller interfaces with external memory 111 through one or more interfaces that may be double data rate (DDR) interfaces. The external memory may include main memory implemented in DRAM. The I/O engine control 117 may interface with standard I/O interfaces such as PCI express (PCIE), gigabit Ethernet (GBE), and Universal Serial Bus.

Cores 101 and GPU 115 and other compute units of SoC 100 can enter an idle state. As will be described in greater detail below, in the idle state, the power state may be limited. While the term processor power state is utilized herein for convenience, the teachings regarding power state applies to any compute unit in SoC 100 or other systems. The compute units may include, but are not limited to CPUs, GPUs, memory controllers, I/O engines, and any hardware block or blocks having configurable power states. Thus, a compute unit may include CPUs or GPUs having a common power state configuration capability.

The power management controller 109 determines the idle states of the various compute units, and controls the power states as described herein. The power management controller 107 communicates with the various compute units through communication signal lines 125.

When the system 100 is operating, the system, or portions thereof may enter a period of low activity where no transfers are taking place, no user input is being received, and the processors are not executing a particular task. In a low active scenario, short periods of activity may occur that accompany the longer periods of inactivity. The scheduler component of the operating system (OS) currently evaluates activity of the various compute units and decides whether to adjust a current power state. The granularity of the scheduler evaluation is typically 10 milliseconds to 100 milliseconds. Thus, the scheduler can miss that the periods of activity only lasted a short interval during a long period of relative inactivity. Thus, the scheduler component may not evaluate activity with sufficient granularity to make optimal choices as to whether to adjust a current power state. The scheduler may see, e.g., high utilization of a core since the last evaluation and cause a power state increase as a result. Power state is typically adjusted by adjusting one or more of clock frequency and/or voltage. The higher the power state, the higher the voltage and/or frequency that is utilized. If the scheduler does not identify such low active scenarios, the scheduler may cause the power state to be increased even though the compute unit is spending a lot of time in idle. If the scheduler checks with increased frequency, an adverse performance impact results. Alternatively, the scheduler could force the lowest operation power state (pstate) (Pmin) but that could result in performance loss for scenarios of higher activity.

The PMC 107 polls the Cores-Idle indication or receives notifications about a change in the "Idle" state. The Core Idle notifications may come as an interrupt to the on-die microcontroller implementing the performance management function from hardware logic that asserts the interrupt based on compute unit activity. That is, an interrupt is sent to the microcontroller when a change in the idle state of a compute unit occurs. If an interrupt is not received, the associated compute unit is assumed to have remained in the same state (idle or not idle). In another embodiment the Core Idle indication as to a change in idle state is received as a hardware generated message to a particular address/register of the microcontroller. The interrupt/message is preferable from a power efficiency standpoint. The frequency of the idle indications (through polling or other notifications) in an embodiment may be once every 1 millisecond. Of course, other idle indication frequencies may be utilized. For example, the interrupt may be generated on a 10 to 100 μsecond basis. Other embodiments may provide an indication every 10 to 100 μseconds, or other appropriate time period, as to the current idle status (idle or not idle) rather than just a change in idle status. Thus, one interrupt or message represents an idle status and another interrupt or message represents a non-idle status. A high level of idleness implies that the compute unit is involved in "short-duration" tasks, which may be executed in a low operational state. The pseudo code shown in FIG. 2 illustrates an embodiment for tracking the idle condition of one or more compute units. The embodiment shown in FIG. 2 tracks a moving average of an idle indication in an idle counter. The count value reflects the level of idleness in the associated compute unit(s). If the indication received as a result of polling or reporting to the PMC 107, shows that the cores are idle and the idle counter is less than a maximum (saturation limit) then the idle counter is increased. If the idle counter has reached its saturation limit, then the idle counter maintains its value. If, on the other hand, the compute unit is not idle and the idle counter is greater than 0, then the idle counter is decremented. In that way a moving average reflecting idleness of the compute unit is maintained. The frequency with which the moving average is updated may be configurable. In an embodiment the moving average is updated every 10 μseconds but that update frequency may be set to other values, e.g., 100 μseconds in another embodiment.

Figure 3:
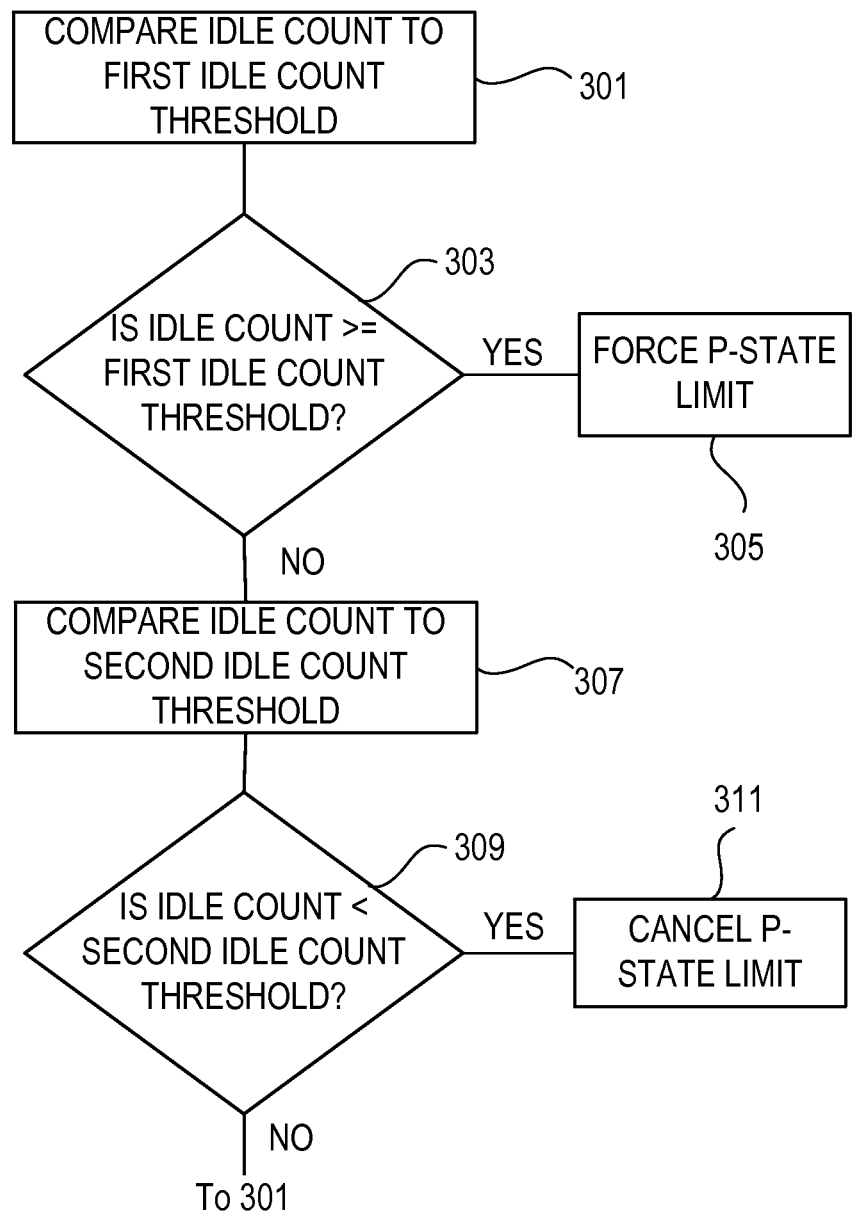
FIG. 3 illustrates a flow chart associated with determining whether to place or release a power state limit on a compute unit.

Referring to FIG. 3, the flow chart illustrates control of the compute unit power state according to an embodiment. In 301, the idle counter, determined, e.g., in accordance with FIG. 2, is compared to a first idle counter threshold. The idle counter threshold may be, e.g., 3 or 4 bits. Other embodiments may allow for a larger or smaller idle count value. In 303 the comparison result is used to determine whether to force a power state (p-state) limit. If the idle counter is greater than or equal to the first idle count threshold, the power state of the compute unit is limited in 305. In an embodiment, the power state is limited by maintaining the power state at the minimum power state that allows short duration tasks to complete. That ensures that short duration high activity tasks do not cause the software scheduler to increase the power state in reaction to the short duration tasks. Note that in embodiments, the power state limit is configurable and different power state limits may be applied based on the idle counter value. For example, if the idle counter is at the maximum value above the first threshold, the minimum power state may be enforced as the power state limit. If the idle counter is above the first threshold but below the maximum idle count value, a second power state limit, higher than the first power state limit, may be used as the power state limit.

Operation of the power control unit continues in 307 where, if the idle count is below the first idle count threshold in 303, the idle count is compared to a second idle count threshold. If in 309 the idle count is less than the second idle count threshold, thereby indicating that the compute unit is not sufficiently idle to force a p-state limit, any p-state limit in force is canceled. In an embodiment, when the P-state limit is canceled, the p-state returns to the p-state prior to the forcing of the P-state. In another embodiment, the p-state limit is increased to a next higher P-state level.

The operation of the power state controller depicted in FIG. 3 may be implemented in software (if sufficiently fast to achieve the required granularity as compared to the software scheduler), in firmware, in hardware, or in any appropriate combination.

Figure 4:
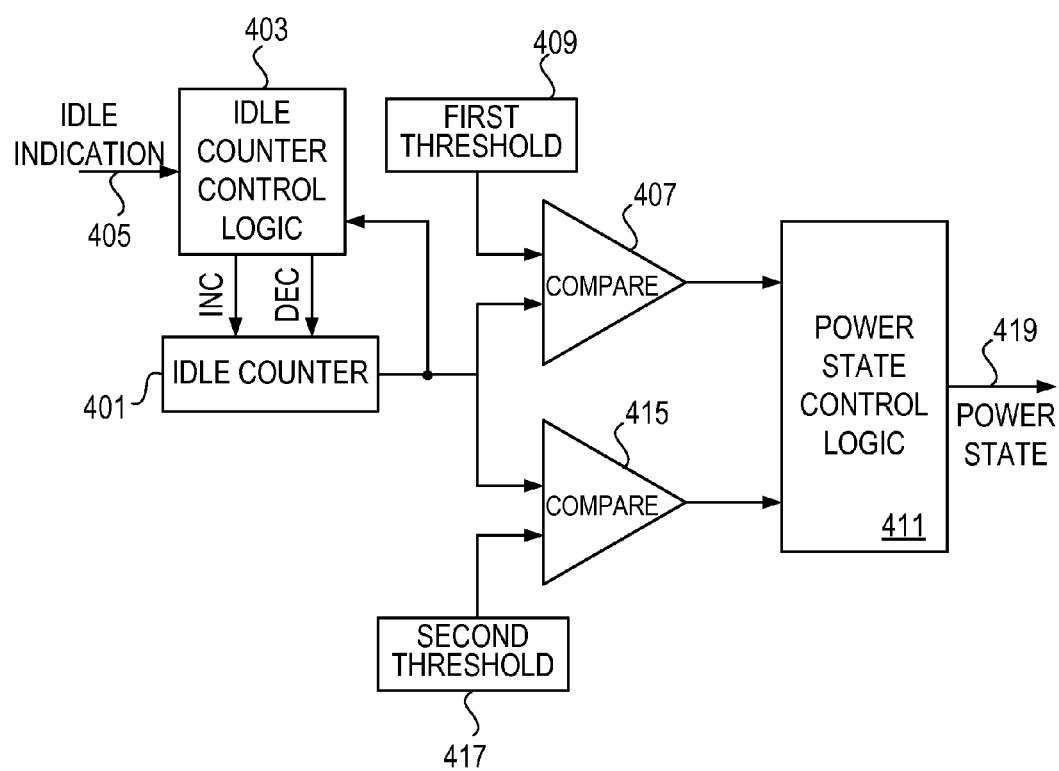
FIG. 4 illustrates a hardware embodiment of a portion of the power state controller according to an embodiment.

A high level block diagram of a hardware implementation to implement the functionality described herein is shown in FIG. 4. While shown as separate hardware components, the logic represented in FIG. 4 may be implemented, e.g., in a programmed microcontroller. An idle counter 401 is incremented or decremented by the idle counter control logic 403 that receives the idle indication 405. The power state control logic 411 may be implemented, e.g., as part of the programmed microcontroller, as a state machine, or other appropriate digital logic to implement the functionality described in the pseudo code shown in FIG. 2. A first comparator 407 compares the idle counter value to a first threshold 409 that may be stored in memory and supplies an indication of the comparison to power state control logic 411. A second comparator 415 compares the idle counter value to the second idle count threshold 417 that may be stored in memory and supplies an indication of the comparison to power state control logic 411. Note that while the compare logic, which may be implemented is part of the programmed microcontroller, is shown as having two comparators, other embodiments may use a single comparator to compare the high and low thresholds to the idle counter value assuming the comparisons are done at different times. Power state control logic 411, which may be implemented as part of the programmed microcontroller, as a state machine, or other suitable digital logic, operates in accordance with the flow diagram of FIG. 3 to generate an appropriate power state signal 419. The power state signal 419 may be used to override the power state that would otherwise be implemented by the software scheduler associated with the OS.

While the embodiments above have been described for a particular system, the approach described herein can be applied to any electronic device such as cell phones, tablets, game consoles, or any of a wide variety of computer systems, where such electronic device has configurable power states. Further, compute units may include CPUs, GPUs, memory controllers, I/O controllers, video controllers, and any hardware block that has a separately configurable power state.

While circuits and physical structures have been generally presumed in describing embodiments of the invention, it is well recognized that in modern semiconductor design and fabrication, physical structures and circuits may be embodied in a computer readable medium as data structures for use in subsequent design, simulation, test, or fabrication stages. For example, such data structures may encode a functional description of circuits or systems of circuits. The functionally descriptive data structures may be, e.g., encoded in a register transfer language (RTL), a hardware description language (HDL), in Verilog, or some other language used for design, simulation, and/or test. Data structures corresponding to embodiments described herein may also be encoded in, e.g., Graphic Database System II (GDSII) data, and functionally describe integrated circuit layout and/or information for photomask generation used to manufacture the integrated circuits. Other data structures, containing functionally descriptive aspects of embodiments described herein, may be used for one or more steps of the manufacturing process.

Computer-readable media include tangible computer readable media, e.g., a disk, tape, or other magnetic, optical, or electronic storage medium. In addition to computer-readable medium having encodings thereon of circuits, systems, and methods, the computer readable media may store instructions as well as data that can be used to implement embodiments described herein or portions thereof. The data structures may be utilized by software executing on one or more processors, firmware executing on hardware, or by a combination of software, firmware, and hardware, as part of the design, simulation, test, or fabrication stages.

The description of the embodiment set forth herein is illustrative, and is not intended to limit the scope of the invention as set forth in the following claims. Other variations and modifications of the embodiments disclosed herein may be made based on the description set forth herein, without departing from the scope of the invention as set forth in the following claims.

What is claimed is:

1. A method comprising:
   tracking an idle state of a hardware component and generating a tracked level of idleness;
   comparing the tracked level of idleness with a first threshold;
   causing a power state of the hardware component to be limited to a low power state if the tracked level of idleness is above the first threshold, to thereby prevent the low power state of the hardware component from being increased in response to detected activity; and
   comparing the tracked level of idleness with a second threshold and removing a power state limit if the tracked level of idleness is below the second threshold.

2. The method as recited in claim 1 wherein the low power state to which the hardware component is limited depends on a value of the tracked level of idleness.

3. The method as recited in claim 1, further comprising generating a moving average as the tracked level of idleness.

4. The method as recited in claim 3, wherein generating the moving average comprises incrementing an idle counter if the hardware component is idle and decrementing the idle counter if the hardware component is not idle.

5. The method as recited in claim 1, wherein the hardware component is a central processing unit or a graphics processing unit.

6. The method as recited in claim 1, wherein tracking the idle state includes receiving an indication of a change in the idle state.

7. The method as recited in claim 1, wherein the hardware component has a power state separately configurable from other hardware components.

8. The method as recited in claim 1, wherein removing the power state limit includes increasing the power state from a current power state to a next higher power state in response to the tracked level of idleness being below the second threshold.

9. The method as recited in claim 1, wherein the power state is defined by at least one of voltage and frequency.

10. A power management controller comprising:
    idle state tracker logic to track an idle state of a hardware component and generate a tracked idle state;
    compare logic to compare the tracked idle state with a first threshold and provide a first compare indication thereof;
    wherein the power management controller is responsive to the first compare indication indicating that the tracked idle state is above the first threshold to cause a power state of the hardware component to be limited to a low power state to thereby prevent the low power state of the hardware component from being increased in response to detected activity;
    the compare logic being further configured to compare the tracked idle state with a second threshold and provide a second compare indication thereof; and
    wherein the power management controller is responsive to the second compare indication indicating that the tracked idle state is below the second threshold to remove a limit to the power state of the hardware component and allow the power state of the hardware component to increase.

11. The power management controller as recited in claim 10 wherein the low power state depends on a value of the tracked idle state.

12. The power management controller as recited in claim 10, wherein the idle state tracker logic is configured to generate a moving average of the idle state as the tracked idle state.

13. The power management controller as recited in claim 12, wherein the idle state tracker logic includes an idle counter and the idle state tracker logic is configured to increment the idle counter if the hardware component is idle and to decrement the idle counter if the hardware component is not idle.

14. The power management controller as recited in claim 10, wherein the hardware component includes a central processing unit or a graphics processing unit.

15. The power management controller as recited in claim 10, wherein an interrupt or message is received to indicate the hardware component being idle.

16. The power management controller as recited in claim 10, wherein the hardware component has a power state separately configurable from other hardware components.

17. The power management controller as recited in claim 10, wherein the power management controller is configured to increase the power state by increasing the power state from a current power state to a next higher power state in response to the tracked idle state being below the second threshold.

18. The power management controller as recited in claim 10, wherein power management controller is configured to change at least one of voltage and frequency of the hardware component to change the power state.

19. A method comprising:

incrementing a count value if a compute unit is determined to be in the idle state and decrementing the count value if the compute unit is determined to not be in the idle state to thereby maintain a moving average indicative of idleness of the compute unit; and comparing the count value with a first idle threshold and causing a power state of the compute unit to be limited to a low power state if the count value is above the first idle threshold; and comparing the count value with a second idle threshold and removing a power state limit if the count value is below the second idle threshold.

20. The method as recited in claim 19 further comprising determining the compute unit to be in the idle state or not be in the idle state according to a received interrupt or a received message.

* * * * *